(12) United States Patent
Ting

(10) Patent No.: US 7,604,509 B2
(45) Date of Patent: Oct. 20, 2009

(54) CARD CONNECTOR

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/283,358

(22) Filed: Sep. 10, 2008

(65) Prior Publication Data

US 2009/0068868 A1    Mar. 12, 2009

(30) Foreign Application Priority Data

Sep. 10, 2007    (TW) .............................. 96133659 A

(51) Int. Cl.
*H01R 24/00* (2006.01)
(52) U.S. Cl. .................................... 439/630; 439/541.5
(58) Field of Classification Search ................... 439/64, 439/159, 541.5, 607, 630
See application file for complete search history.

(56) References Cited

U.S. PATENT DOCUMENTS

| | | | | |
|---|---|---|---|---|
| 5,591,047 A * | 1/1997 | Yamada et al. ........... | 439/541.5 |
| 6,059,586 A * | 5/2000 | Watanabe et al. ........... | 439/159 |
| 6,102,708 A * | 8/2000 | Kimura ........................ | 439/64 |
| 6,120,322 A | 9/2000 | Ho | |
| 6,183,273 B1 * | 2/2001 | Yu et al. ........................ | 439/92 |
| 6,379,163 B1 * | 4/2002 | Yu .............................. | 439/95 |
| 7,052,316 B2 * | 5/2006 | Tanigawa et al. ......... | 439/541.5 |
| 7,189,088 B2 | 3/2007 | Cheng | |
| 2006/0196781 A1 | 9/2006 | Kimura | |

* cited by examiner

*Primary Examiner*—Thanh-Tam T Le
(74) *Attorney, Agent, or Firm*—Andrew C. Cheng; Wei Te Chung; Ming Chieh Chang

(57) ABSTRACT

A card connector (100) includes an insulating housing (4) receiving a plurality of terminals, a first shell (1) mounted on the insulating housing to define a first receiving space for retaining a first card and having a locking piece (15, 16) on a lateral side thereof, a second shell (2) mounted on the insulating housing opposite to the first shell to define a second receiving space for retaining a second card and having a locking piece (25, 26) on a lateral side thereof, a partition plate placed between the first shell and the second shell and between the first receiving space and the second receiving space, and a stand off (7) mounted on a lateral side of the first shell and the second shell and comprising a pair of locking devices (74, 72) fastening with the locking pieces of the first shell and the second shell.

14 Claims, 3 Drawing Sheets

CARD CONNECTOR

BACKGROUND OF THE INVENTION

1. Field of the Invention

The present invention relates to a card connector, and particularly to a card connector comprising a stand off.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card.

Memory card connectors that allow two memory cards to be simultaneously connected to a single memory card are also available in the market. Such a memory card connector usually comprises two connectors, and each connector is capable of receiving one memory card and stacked with the other. Example is disclosed in U.S. Pat. No. 2006/0196781. Such a stacked card connector comprises an upper connector and a lower connector stacked with the upper connector. The upper connector and the lower connector each has an insulating housing. On a rear end of each insulating housing, a pair of fixing holes are defined for screws fastened therein orderly. Thus, the upper connector and the lower connector are mounted with each other to receive a card simultaneously.

However, the screws is only mounted on the rear portion of the stacked card connector, and there is no fastening feature fixed on the former portion thereof. Therefore, when the card connector is in assembly or in operation, the former portion of the card connector will be loosen. As a result, it is possible that the upper connector and the lower connector will move away form each other. Thus, a special fastening feature is needed to assembly the upper one and the lower one together. Thus, a special fastening feature is needed to assembly the upper one and the lower one together.

Therefore, the present invention is directed to solving the problem by providing a card connector which has a special fastening feature.

SUMMARY OF THE INVENTION

An object, therefore, of the invention is to provide a card connector having an upper connector and a lower connector stacked with each other stably.

In the exemplary embodiment of the invention, a card connector includes an insulating housing receiving a plurality of terminals, a first shell mounted on the insulating housing to define a first receiving space for retaining a first card and having a locking piece on a lateral side thereof, a second shell mounted on the insulating housing opposite to the first shell to define a second receiving space for retaining a second card and having a locking piece on a lateral side thereof, a partition plate placed between the first shell and the second shell and between the first receiving space and the second receiving space, and a stand off mounted on a lateral side of the first shell and the second shell and comprising a pair of locking devices fastening with the locking pieces of the first shell and the second shell.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
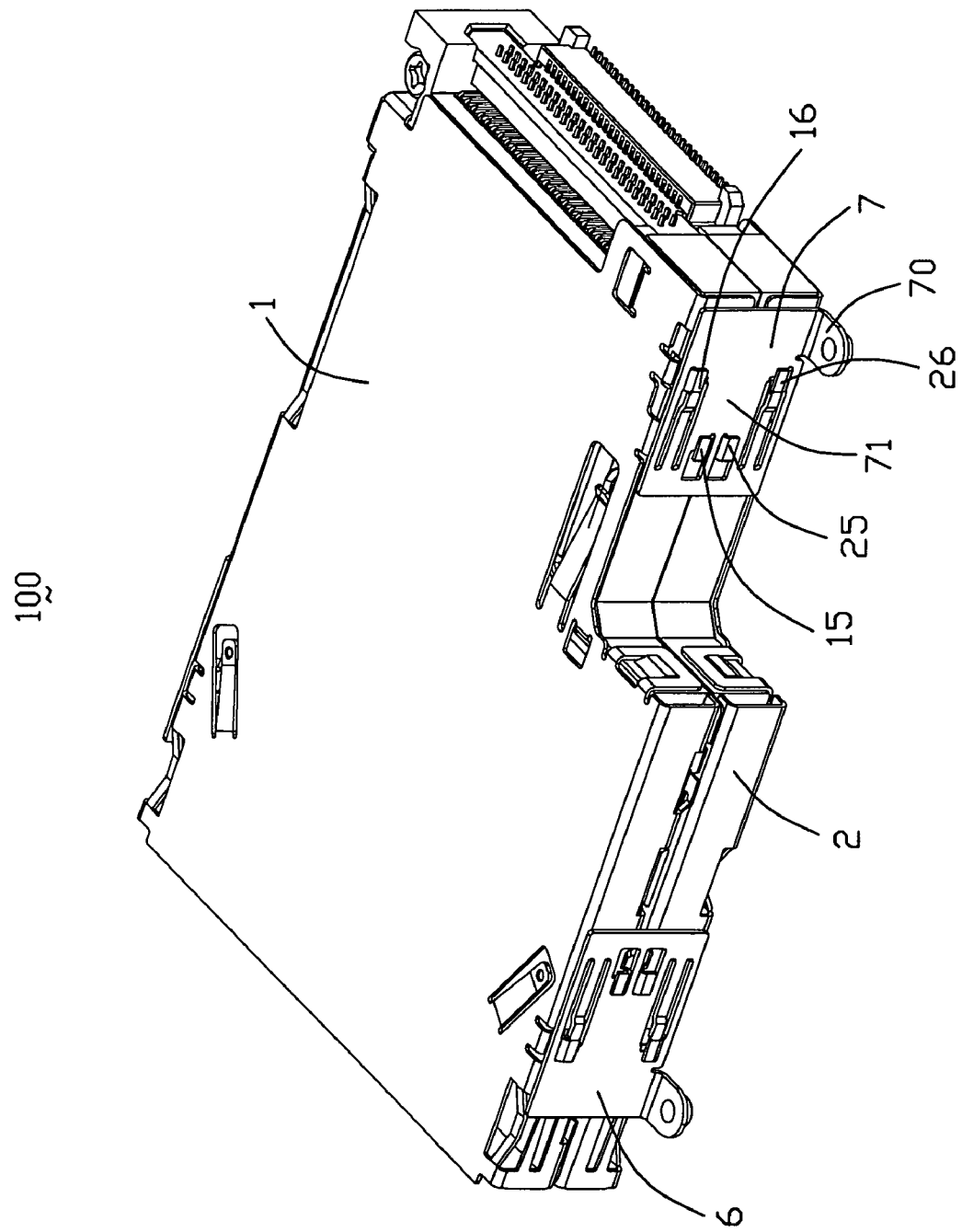
FIG. 1 is a perspective view of a card connector of present invention.
Figure 2:
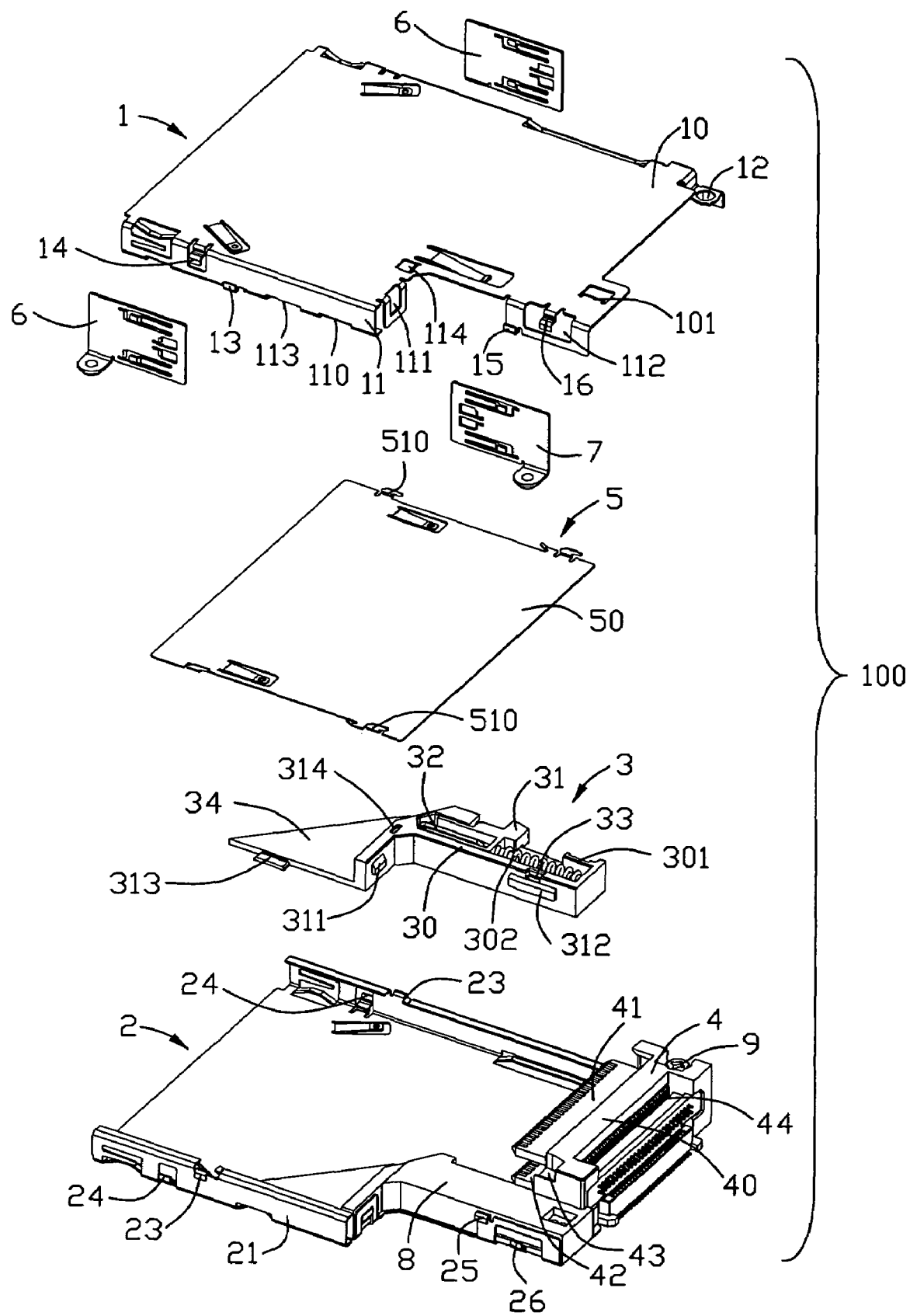
FIG. 2 is an exploded view of the card connector of present invention as shown in FIG. 1.
Figure 3:
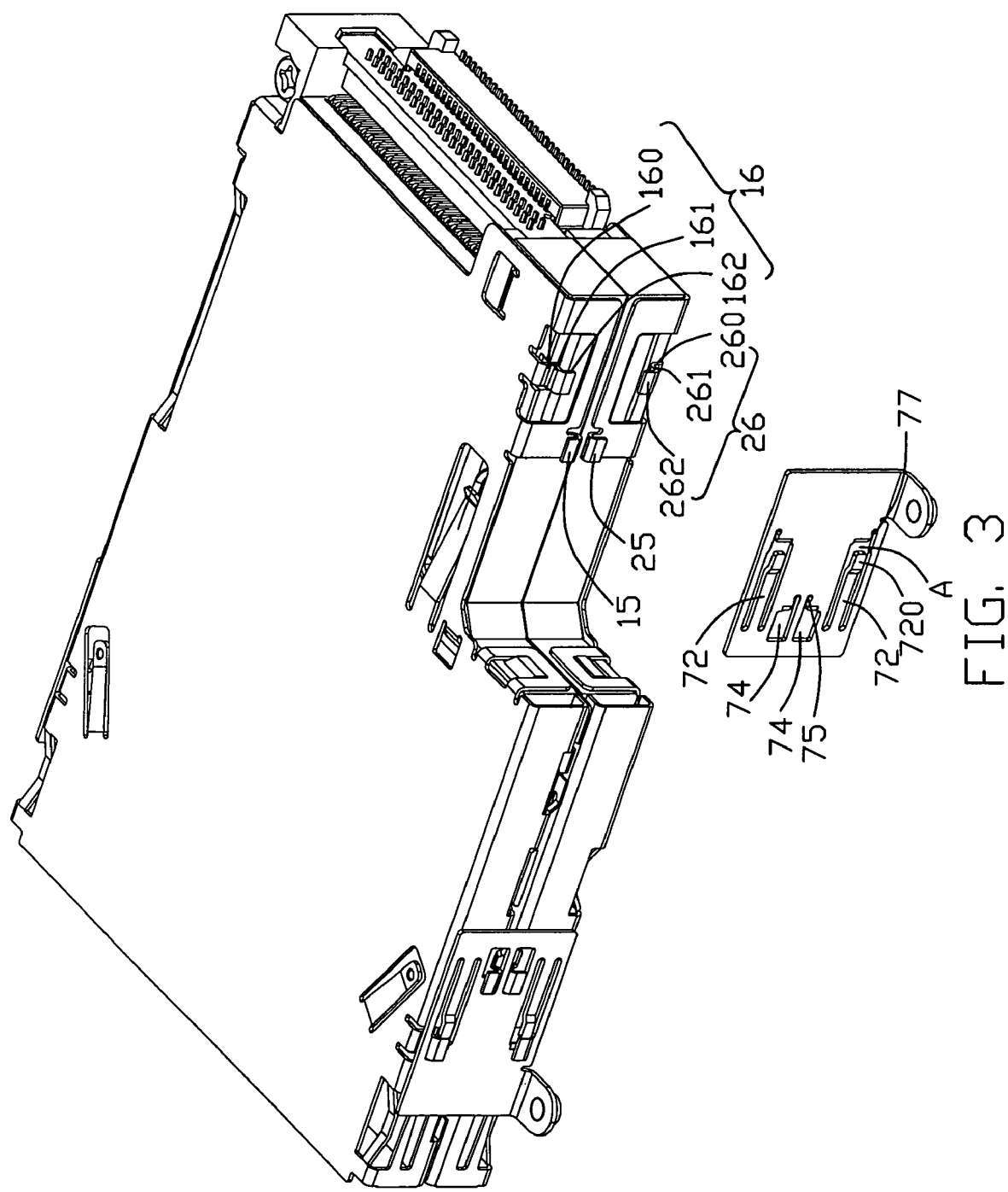
FIG. 3 is a perspective view of a second stand off of the card connector discharge from the card connector.

Referring to FIG. 1 to FIG. 3, the present invention provides a card connector 100 to receive a first card (not shown) and a second card (not shown) simultaneously and placed on a circuit board (not shown). The card connector 100 comprises an insulating housing 4, a first shell 1 attached to the insulating housing 4, a second shell 2 attached to and disposed under the insulating housing 4 respect to the printed circuit board, a partition plate 5 mounted between the first shell 1 and the second shell 2, a first ejecting mechanism 3 packed by the first shell 1, a second ejecting mechanism 8 packed by the second shell 2, a pair of first stand offs 6 and a second stand off 7. The first ejecting mechanism 3 and the second mechanism 8 are mounted on a same side of the card connector 100 and opposite to each other adapt for remove cards in a desirable position. The pair of first stand off 6 are located on front position of the card connector 100 and opposite to each other, and the second stand off 7 is located on a rear position of the card connector 100 and opposite to each other, in order to achieve a steady structure of the card connector 100.

In this embodiment, the first shell 1 and the second shell 2 are designed approximately in the same way. So a detailed description of the first shell 1 will be illustrated, and the detailed description of the second shell 2 will be omitted.

Please particular to FIG. 2, the first shell 1 is approximately of an L-shape and defines a first receiving space with the insulating housing 4 adapted for selecting receiving a first card, which is of an L-shape or a rectangular shape. The first shell 1 includes a flat main body 10 and a plurality of side walls 11, each extending downwardly from an edge of the main body 10. The main body 10 has a front end portion from which the first card is inserted and a rear end portion opposite to the front end portion, wherein the width of the front end portion is wider than that of the rear end portion. A first and second position piece 101 and 114 are defined on the main portion 10, each extending downwardly from the main portion 10, wherein the first position piece 101 is located on a rear end of the narrower portion and the second position piece 114 is located on rear end of the wider portion. Moreover, there have four pair of locking pieces 13, 14, 15 and 16 defined on the side walls 11 of the first shell 1, wherein two pairs are located on that of the wider portion and the other pairs are located on that of the narrower portion. Additionally, please particular refer to FIG. 3, the first piece 13 has a same configuration with the third piece 15 and the second piece 14 has a same configuration with the fourth piece 16, wherein each of the first and third piece 13 and 15 extends upwardly from a lower edge of the side wall 11 and each of the second and fourth pieces 14 and 16 extends downwardly from an upper edge of the side wall. Furthermore, the side walls of the wider portion define two pairs of first and second fasten gap 110 and 113. Corresponding to the fourth locking piece 16, there has a locking hole 112, said fourth locking piece 16 extending downwardly from an upper edge of the locking hole 112. Meanwhile, the rear end of wider portion defines a holding piece (not labeled) with a second locking hole 111, wherein the holding piece extends downwardly from a rear end edge of the wider portion and perpendicular with and adjacent to one side wall 11 of the first shell 1. A screw hole 12 is defined on a rear end section of the narrower portion adapted for assembling wit the insulating housing 4 and the second shell 2.

Reference to FIG. 1 to FIG. 3, corresponding to the locking pieces of the first shell 1 as described above, there are four pair of locking pieces 24, 26, 23, 25 on the second shell 2. The locking pieces 24, 26 are substantially identical with the first locking pieces 14, 16 of the first shell 1 except their contrary projecting direction. The locking pieces 23, 25 are substantially identical with the second locking pieces 13, 15 of the first shell 1 except their contrary projecting direction. Each of the locking pieces 16, 26, respectively, comprise an upright wall 160, 260, a level wall 161, 261 extending outwardly from corresponding upright wall 160, 260, and an engaging wall 162, 262 extending from corresponding level wall 161, 261. The second locking piece 15, 25 are essentially of a clasp type and extend upwardly and downwardly from the first shell 1 and the second shell 2, respectively. The detailed structures of the first locking piece 14, 24 and the second locking piece 13, 23 are omitted.

As shown in FIG. 2, the partition plate 5 is constructed according to the wider portion of the main body, and having a main panel 50 and a plurality of stabs 510 on each lateral side of the main panel 50 to couple to the fastening gaps 110 of the first shell 1.

Continue with FIG. 2, the first ejecting mechanism 3 comprises a base member 30, a sliding member 31 moving with the card inserting/ejecting, a locking member 32 to position the sliding member 31 in a desirable position and a spring member 302 to move the sliding member 31 in an original position. A triangle plate 34 is adapted to guiding different card inserted and extends forwardly from a former end of the base member 30. On a linear edge of the triangle plate 34, a heave 313 is formed for coupling to the second fastening gap 113 of the first shell 1. On the upper surface of the base member 30, a position hole 33 and a receiving gap 314 are defined. A pressed groove 301 is formed in an inner face of the base member 30. Besides, a first embossment 312 and a second embossment 311 protrude from the lateral side of the base member 30 for fastening with the first locking hole 112 and the second locking hole 111, respectively. The operation process of the first ejecting mechanism 3 is omitted as a result of it has been known as a public.

Regarding to the insulating housing 4, it has a base section 40, a first engaging plate 41, and a second engaging plate 42. The base section 40 is of a longitudinal shape, and the first engaging plate 41 and the second engaging plate 42 extend forwardly from the base section 40, respectively. A plurality of first terminals 44 and second terminals (not labeled) are received in the first engaging plate 41 and the second engaging plate 42, respectively, to connect with a first card and a second card electrically. Besides, an indentation 43 is formed on one end of the base section 40 allowing the ejecting member 31 of the first ejecting mechanism to slide together with a card ejecting or inserting. Corresponding to the second ejecting mechanism 8, there also is an indentation (not labeled) on the opposite face of the base section 40.

Referring to FIG. 3 primarily, the second stand off 7 will be illustrated in detail, and the description of the first stand off 6 will be omitted because of their identical structure. The second stand off 7 is mainly served as a connecting component between the card connector 100 and the printed circuit board, and a securing component to make the first shell 1 assembled with the second shell 2 stably. The second stand off 7 has a foot section 70 to be placed on the printed circuit board, and an installing section 71 to be locked with the first shell 1 and the second shell 2. The installing section 71 comprises a pair of elastic beams 72 of a cantilever beam type allowing the first locking piece 16, 26 to be installed, and a pair of clasping holes 74 allowing the second locking piece 15, 25 to go through. Each elastic beam 72 has a spring header 720 protruding outwardly from the free end thereof cause to a space A between the spring header 720 and the installing section 71. Opposite to each of the header portion 720, a first gap 77 is defined to receive the first locking piece 16, 26, respectively. Similarly, a second gap 75 extends from each locking clasping hole 74 to receive the second locking piece 15, 25. In this embodiment, each clasping hole 74 has a width allowing the second locking piece 15, 25 to go through properly and slide into the second gap 75. Moreover, the dual clasping holes 74 are located between the two elastic beams 72 in a symmetrical manner, and the elastic beams 72 extend in a same direction. Such designed manner can achieve a convenient step in a process of punch. In other embodiment, the elastic beams 72 and the clasping holes 74 can be placed in an interlaced manner or other manners.

The relationship between the elements of the card connector 100 as described above will be illustrated in following segments, particularly for an assembly approach of the second stand off 7.

The first shell 1 and the second shell 2, respectively, are mounted on opposite faces of the insulating housing 4 in a symmetrical manner respect to the partition plate 5. The partition plate 5 is situated between the first shell 1 and the second shell 2 by the stabs 510 locking in the fastening gaps 110 of the first shell 1 cause to the first receiving space and a second receiving space for receiving a second card. The first ejecting mechanism 3 covered by the first shell 1 completely with the first embossment 312 and the second embossment 311 received in the first locking hole 112 and the second locking hole 111, respectively, the heave 313 of the triangle plate 34 received in the second fastening gap 110. Then the level wall 161, 261 of the first locking piece 16, 26 rightly situated in the position hole 33 of the first ejecting mechanism 3 and the second ejecting mechanism 8. Furthermore, the first ejecting mechanism 3 and the second ejecting mechanism are placed in a symmetrically manner respect to the partition plate 5.

The second stand off 7 is mounted on one rear end of the card connector in following step. Firstly, make the second locking pieces 15, 25 of the first shell 1 and the second shell 2 passing through corresponding clasping holes 75 properly, at the same time, the first locking pieces 16, 26 push the pair of elastic beams 72 outwardly. Then moving the second stand off 7 backwardly till the second locking pieces 15, 25 are received in corresponding second gaps 75 completely, in this state, the first locking pieces 16, 26 are divorced from the pair of elastic beams 72 and slide into corresponding first gaps 77 rightly, in order to avoid an upward or downward remove of the second stand off 7. A side face of each header device 720 collides with a side face of corresponding second locking piece 16, 26 in such manner that the outer surface of the second locking piece 16, 26 are in a same plane with the outer surface of the header device 720, in order to avoid a side remove of the second stand off 7. The dual first stand offs 6 are locked with the first shell 1 and the second shell 2 together in a same manner as the second stand off 7 mounted. With the second stand off 7 fixed on one rear end of the card connector 100 instead of a screw on the insulating housing, the other rear end of the card connector is fixed by a screw 9 passing through the screw holes 12 on the first shell 1, the insulating housing 4 and the second shell 2 orderly. Additionally, the second stand off 7 is located at one end of the insulating housing 4, and the screw 9 is mounted at the other end of the insulating housing 4 to support an equilibrant fixing force for the card connector 100.

According with present invention, on one hand, there is only with one screw 9 to fix one rear end of the card connector, and the other end with the second stand off 7 to save more room for the first ejecting mechanism 3 and the second mechanism 8 receiving. On the other hand, the second stand off 7 is locked with the first shell 1 and the second shell 2 together with the level walls 161, 261 of the first locking piece 16, 26 retained in corresponding position hole 33 of the first ejecting mechanism 3 and the second mechanism 8 to support an additional pressing force. Additionally, the first ejecting mechanism 3 and the second ejecting mechanism 8 are placed back to back to avoid an interference therebetween. As a result, the first ejecting mechanism 3 and the second ejecting mechanism 8 are situated more firmly and reliably. With the pairs of first stand offs 6 locked on the former opposite portions of the card connector 100 and the second stand off 7 on the rear end thereof, the card connector 100 is more firmly but do not need many screws mounted thereon.

In this embodiment of present invention, either one clasping hole or elastic beam of the stand off may be constituted a locking device to lock with the locking piece of a corresponding shell.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A card connector, comprising:
an insulating housing receiving a plurality of terminals;
a first shell mounted on the insulating housing to define a first receiving space for retaining a first card and having a locking piece;
a second shell mounted on the insulating housing opposite to the first shell to define a second receiving space for retaining a second card and having a locking piece;
a partition plate placed between the first shell and the second shell and between the first receiving space and the second receiving space; and
a stand off attached to side surfaces of the first and second shell and comprising a pair of locking devices engaging with the locking pieces of the first and second shell;
wherein each locking device of the stand off comprises a clasping hole extending along a first direction and a cantilever elastic beam extending along the first direction and disposed above or below of the clasping hole, and each of the locking pieces comprises a first locking piece and a second locking piece to be locked with the elastic beams and the clasping holes, respectively;
wherein the stand off comprises a pair of first gaps opposite to the elastic beams along the first direction, and the first locking pieces are received in the first gaps;
wherein each elastic beam comprises a spring header facing to the first gap, and a side surface of the first locking piece collides with an end surface of the spring header;
wherein an outer surface of the spring header is in a same plane with an outer face of the first locking piece; and
wherein the stand off comprises a pair of second gaps communicating with corresponding clasping holes, and the second locking pieces are received in the second gaps.

2. The card connector as claimed in claim 1, wherein the first shell and the second shell are placed in a symmetrical manner with respect to the partition plate.

3. The card connector as claimed in claim 1, wherein the stand off comprises a first stand off mounted on a rear end of the first and second shell, and a pair of second stand offs mounted on front end thereof.

4. The card connector as claimed in claim 1, further comprising a screw mounted on the insulating housing from above.

5. The card connector as claimed in claim 1, further comprising a first ejecting mechanism and a second mechanism received in the first and second receiving space and opposite to each other, respectively, and covered by the first shell and the second shell completely.

6. The card connector as claimed in claim 5, wherein each locking piece comprises an upright wall extending from a side edge of the corresponding shell and integrated with the shell, a level wall extending outwardly from the upright wall and an engaging wall extending from the level wall.

7. The card connector as claimed in claim 6, wherein each of the first ejecting mechanism and the second ejecting mechanism comprises a base member, a sliding member moving with a card inserting/ejecting, a locking member to lock the sliding member in a desirable position and a spring member to move the sliding member in an original position, and each base member comprises a position hole, and the level walls of the locking device retained in corresponding position holes.

8. The card connector as claimed in claim 1, wherein the insulating housing comprises a base section, a first engaging plate and a second engaging plate extending forwardly from the base section, respectively, to receive the terminals.

9. The card connector as claimed in claim 1, wherein the first and second locking pieces, one extending downwardly from an upper edge of the first or second shell and the other extending uprightly from a lower edge thereof.

10. The card connector as claimed in claim 9, wherein the second locking piece is of a U-shaped or conversed U-shaped configuration.

11. The card connector as claimed in claim 1, wherein the stand off includes a main board attached onto the side suites of the first and second shell and a lateral board vertical to the main board adapted for fasten the card connector onto a printed circuit board.

12. A card connector assembly comprising:
upper and lower connector units stacked with each other;
an upper metallic shell located on the upper connector unit and defining an upper receiving space for retaining an upper card;
a lower metallic shell located under the lower connector unit and defining a lower receiving space for retaining a lower card;
a partition plate placed between the upper receiving space and the lower receiving space;

a pair of ejecting mechanisms located on front lateral edge areas of said upper shell and said lower shell, respectively; and a stand off fastened to both side surfaces extending, respectively, upwardly from a top surface of the upper metallic shell and downwardly from a lower surface of the lower metallic shell, and adapted to not only retain both upper and lower connector units upon a printed circuit board also fasten both said upper and lower connector units together;

wherein the upper metallic shell comprises a locking piece;

wherein the lower metallic shell comprises a locking piece;

wherein the stand off comprises a pair of locking devices engaging with the locking pieces of the first and second shells;

wherein each locking device of the stand off comprises a clasping hole extending along a first direction and a cantilever elastic beam extending along the first direction and disposed above or below of the clasping hole, and each of the locking pieces comprises a first locking piece and a second locking piece to be locked with the elastic beams and the clasping holes, respectively;

wherein the stand off comprises a pair of first gaps opposite to the elastic beams along the first direction, and the first locking pieces are received in the first gaps;

wherein each elastic beam comprises a spring header facing to the first gap, and a side surface of the first locking piece collides with an end surface of the spring header;

wherein an outer surface of the spring header is in a same plane with an outer face of the first locking piece; and wherein the stand off comprises a pair of second gaps communicating with corresponding clasping holes, and the second locking pieces are received in the second gaps.

13. The card connector assembly as claimed in claim 12, wherein each of said upper and lower shell is of an L-shaped configuration, and said front lateral edge area is located at a cutout corner of said L-shaped configuration where is far away from two opposite outermost lateral edges of the corresponding shell in both a transverse direction and a front-to-back direction of the corresponding shell.

14. A card connector assembly comprising:

upper and lower connector units stacked with each other;

an upper metallic shell located on the upper connector unit and defining an upper receiving space for retaining an upper card;

a lower metallic shell located under the lower connector unit and defining a lower receiving space for retaining a lower card;

a partition plate placed between the upper receiving space and the lower receiving space;

a pair of ejecting mechanisms located on front lateral edge areas of said upper shell and said lower shell, respectively; and a stand off fastened to both said front lateral edge areas to not only retain both upper and lower connector units upon a printed circuit board also fasten both said upper and lower connector units together; wherein each of said upper and lower shell is of an L-shaped configuration, and said front lateral edge area is located at a cutout corner of said L-shaped configuration where is far away from two opposite outermost lateral edges of the corresponding shell in both a transverse direction and a front-to-back direction of the corresponding shell;

wherein the upper metallic shell comprises a locking piece;

wherein the lower metallic shell comprises a locking piece;

wherein the stand off comprises a pair of locking devices engaging with the locking pieces of the first and second shells;

wherein each locking device of the stand off comprises a clasping hole extending along a first direction and a cantilever elastic beam extending along the first direction and disposed above or below of the clasping hole, and each of the locking pieces comprises a first locking piece and a second locking piece to be locked with the elastic beams and the clasping holes, respectively;

wherein the stand off comprises a pair of first gaps opposite to the elastic beams along the first direction, and the first locking pieces are received in the first gaps;

wherein each elastic beam comprises a spring header facing to the first gap, and a side surface of the first locking piece collides with an end surface of the spring header;

wherein an outer surface of the spring header is in a same plane with an outer face of the first locking piece; and wherein the stand off comprises a pair of second gaps communicating with corresponding clasping holes, and the second locking pieces are received in the second gaps.

* * * * *